US010218598B2

(12) United States Patent
Bermudez et al.

(10) Patent No.: US 10,218,598 B2
(45) Date of Patent: Feb. 26, 2019

(54) AUTOMATIC PARSING OF BINARY-BASED APPLICATION PROTOCOLS USING NETWORK TRAFFIC

(71) Applicant: Narus, Inc., Sunnyvale, CA (US)

(72) Inventors: Ignacio Bermudez, Astoria, NY (US); Marios Iliofotou, Sunnyvale, CA (US); Marco Mellia, Turin (IT); Ram Keralapura, San Jose, CA (US); Maurizio Matteo Munafo, Turin (IT)

(73) Assignee: Narus, Inc., Sunnyvale, CA (US)

( * ) Notice: Subject to any disclaimer, the term of this patent is extended or adjusted under 35 U.S.C. 154(b) by 323 days.

(21) Appl. No.: 15/271,920

(22) Filed: Sep. 21, 2016

(65) Prior Publication Data

US 2017/0012853 A1 Jan. 12, 2017

Related U.S. Application Data

(63) Continuation of application No. 13/917,535, filed on Jun. 13, 2013, now Pat. No. 9,473,380.

(51) Int. Cl.
*H04L 12/26* (2006.01)
*G06F 17/30* (2006.01)
*G06N 99/00* (2010.01)
*G06F 8/53* (2018.01)
*H04L 12/24* (2006.01)
(Continued)

(52) U.S. Cl.
CPC .............. *H04L 43/18* (2013.01); *G06F 8/53* (2013.01); *G06F 17/30861* (2013.01); *G06F 17/30867* (2013.01); *G06F 17/30908* (2013.01); *G06N 99/005* (2013.01); *H04L 41/142* (2013.01); *H04L 51/34* (2013.01); *H04L 69/00* (2013.01)

(58) Field of Classification Search
CPC ......... G06F 17/30861; G06F 17/30867; G06F 17/30908; G06F 8/53; H04L 43/18; G06K 9/6256; G06N 99/005
See application file for complete search history.

(56) References Cited

U.S. PATENT DOCUMENTS

2008/0140589 A1* 6/2008 Basu .................... G06K 9/6256
706/12
2009/0254891 A1* 10/2009 Cui ........................... G06F 8/53
717/138

OTHER PUBLICATIONS

"U.S. Appl. No. 13/917,535, Notice of Allowance dated Jun. 30, 2016", 10 pgs.

(Continued)

*Primary Examiner* — Philip J Chea
*Assistant Examiner* — Mohammed Ahmed
(74) *Attorney, Agent, or Firm* — Kwan & Olynick LLP

(57) ABSTRACT

A method for analyzing a binary-based application protocol of a network. The method includes obtaining conversations from the network, extracting content of a candidate field from a message in each conversation, calculating a randomness measure of the content to represent a level of randomness of the content across all conversation, calculating a correlation measure of the content to represent a level of correlation, across all of conversations, between the content and an attribute of a corresponding conversation where the message containing the candidate field is located, and selecting, based on the randomness measure and the correlation measure, and using a pre-determined field selection criterion, the candidate offset from a set of candidate offsets as the offset defined by the protocol.

17 Claims, 8 Drawing Sheets

(51) Int. Cl.
*H04L 29/06* (2006.01)
*H04L 12/58* (2006.01)

(56) References Cited

OTHER PUBLICATIONS

"U.S. Appl. No. 13/917,535, Restriction Requirement dated Mar. 7, 2016", 9 pgs.

Beddoe, Marshall A., "Network Protocol Analysis Using Bioinformatics Algorithms", Marshall_Beddoe@McAfee.com, 2005, 5 pgs.

Caballero, Juan et al., "Dispatcher: Enabling Active Botnet Infiltration Using Automatic Protocol Reverse-Engineering", CCS Conference 2009, 14 pgs.

Leita, Corrado et al., "ScriptGen: An Automated Script Generation Tool for Honeyd", ACSAC Conference 2005, 12 pgs.

* cited by examiner

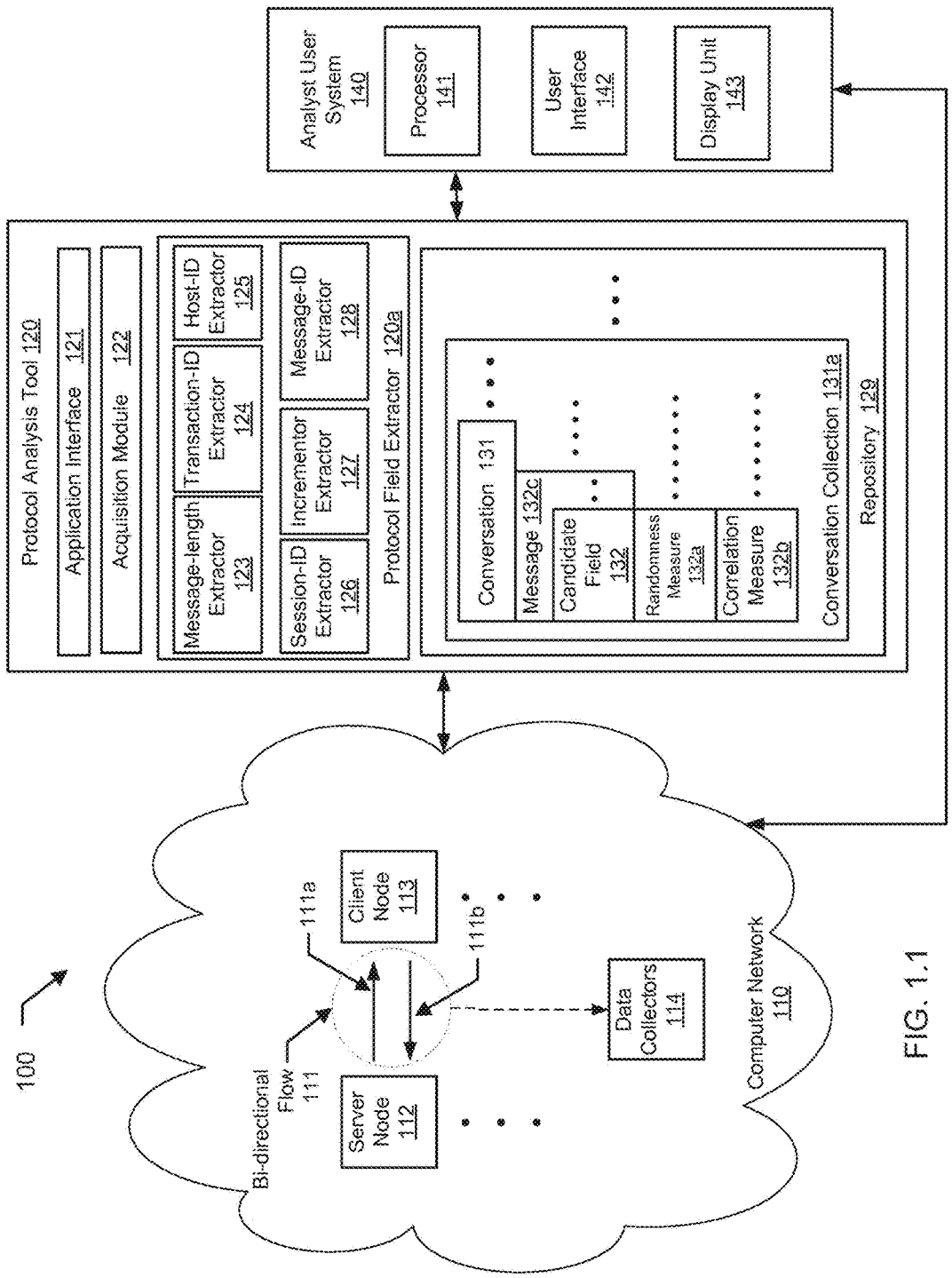
FIG. 1.1

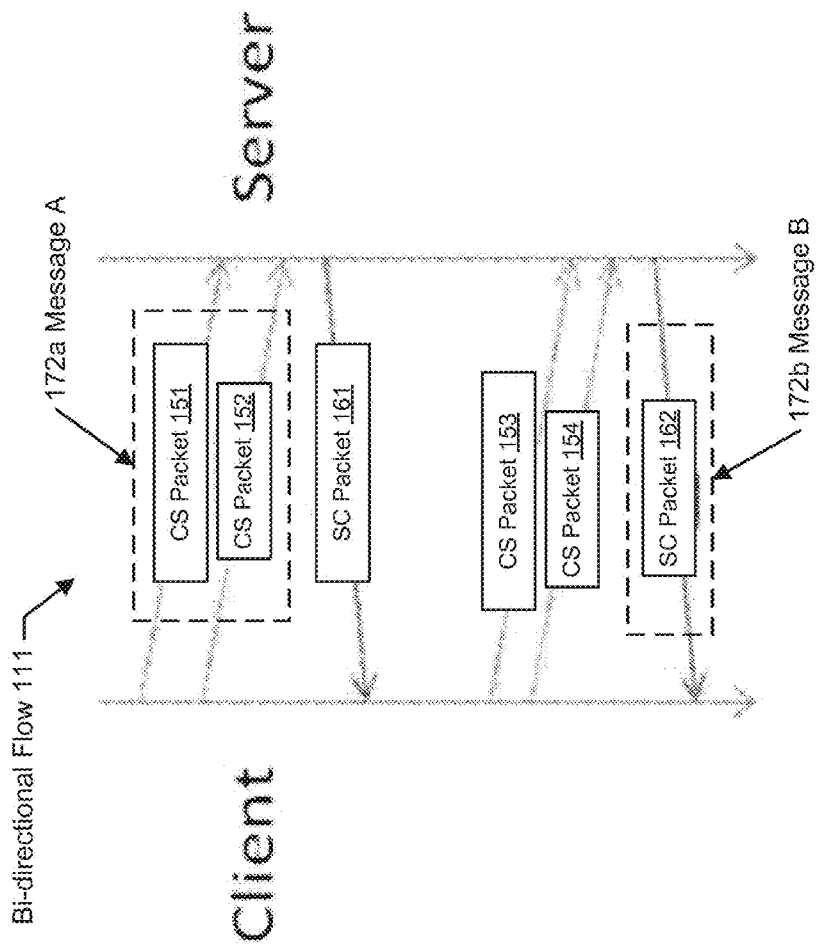
FIG. 1.2

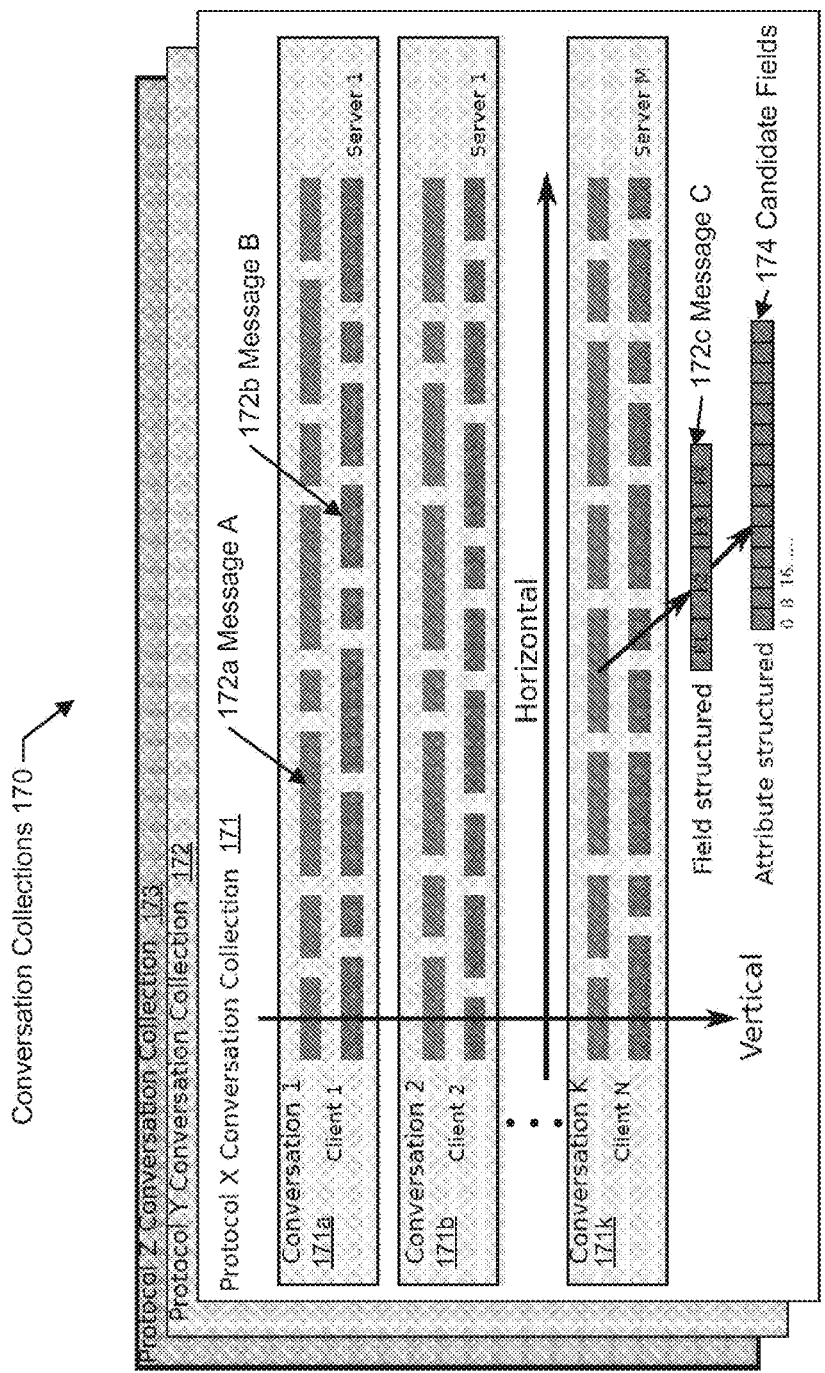
FIG. 1.3

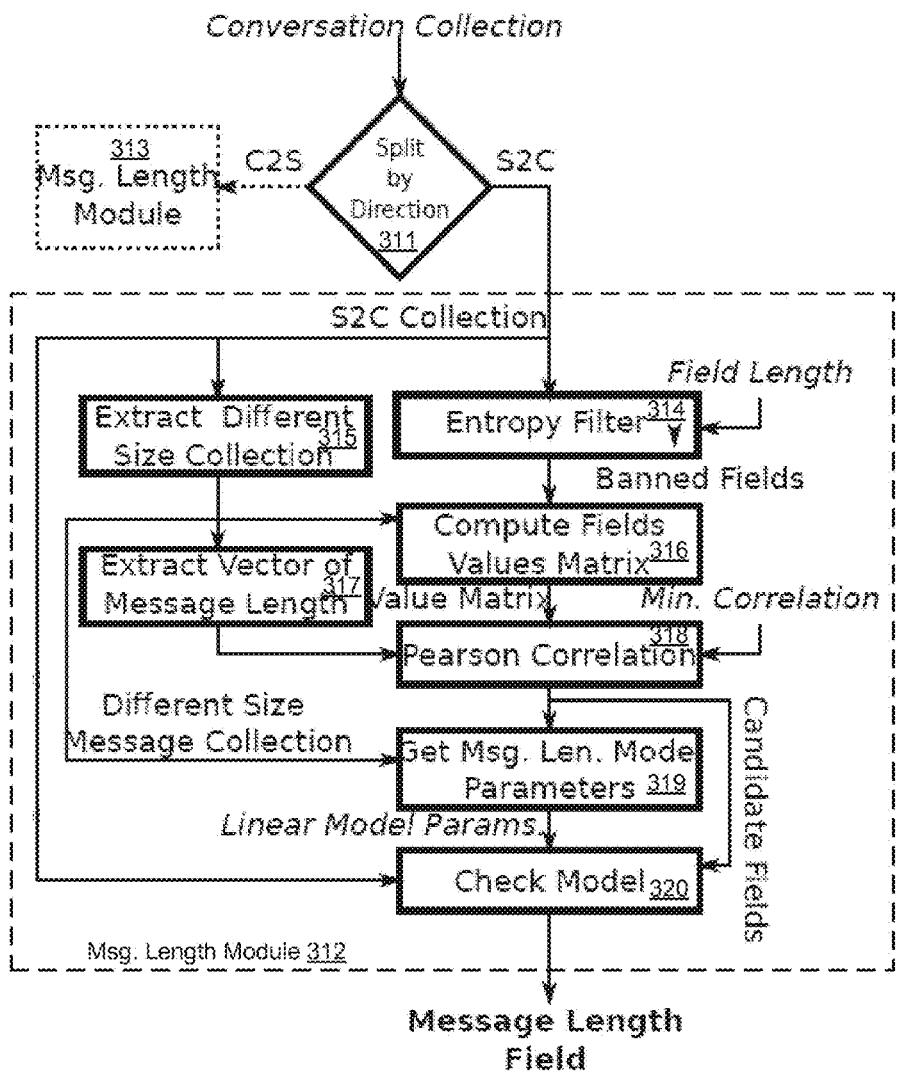
FIG. 3.1

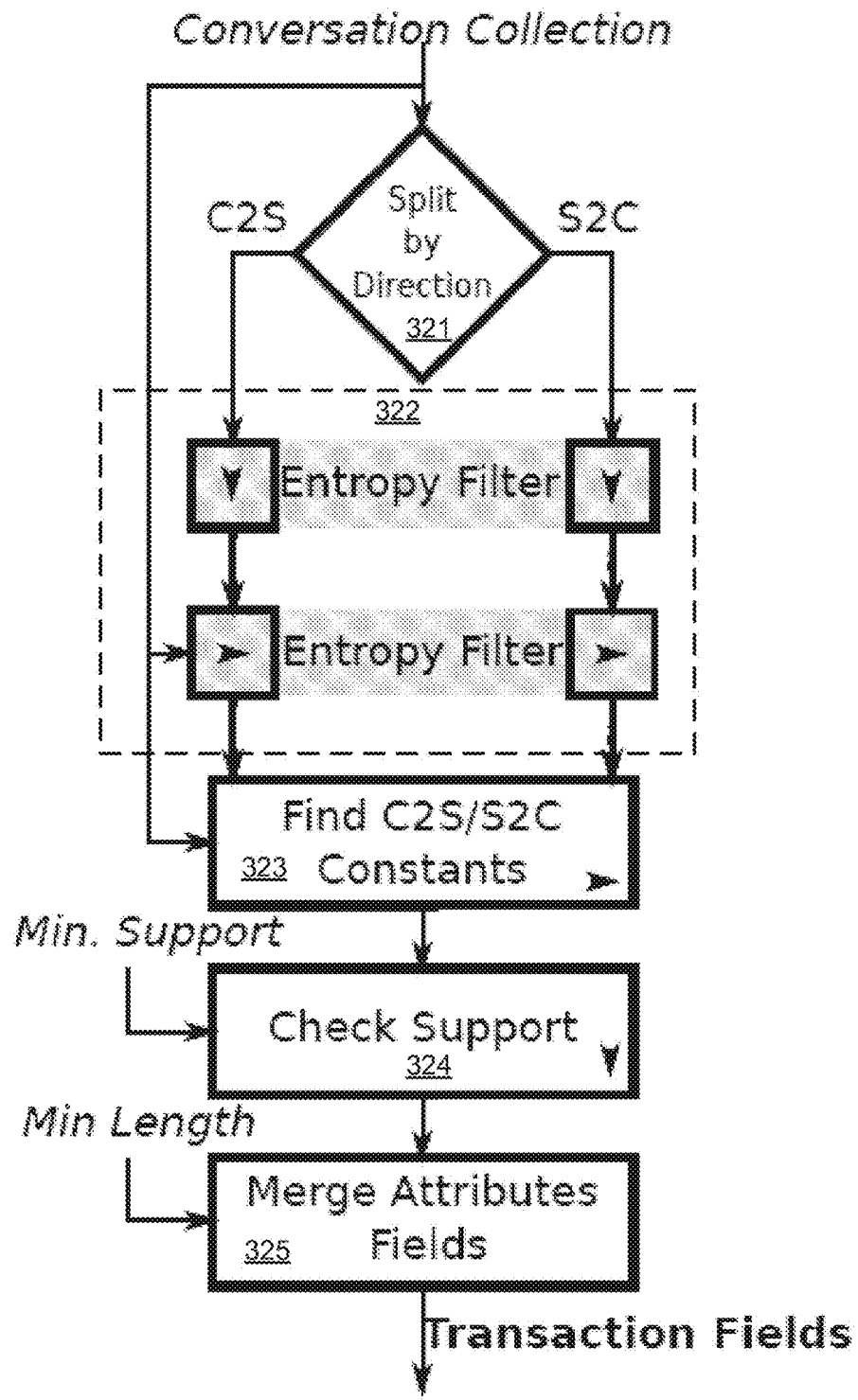
FIG. 3.2

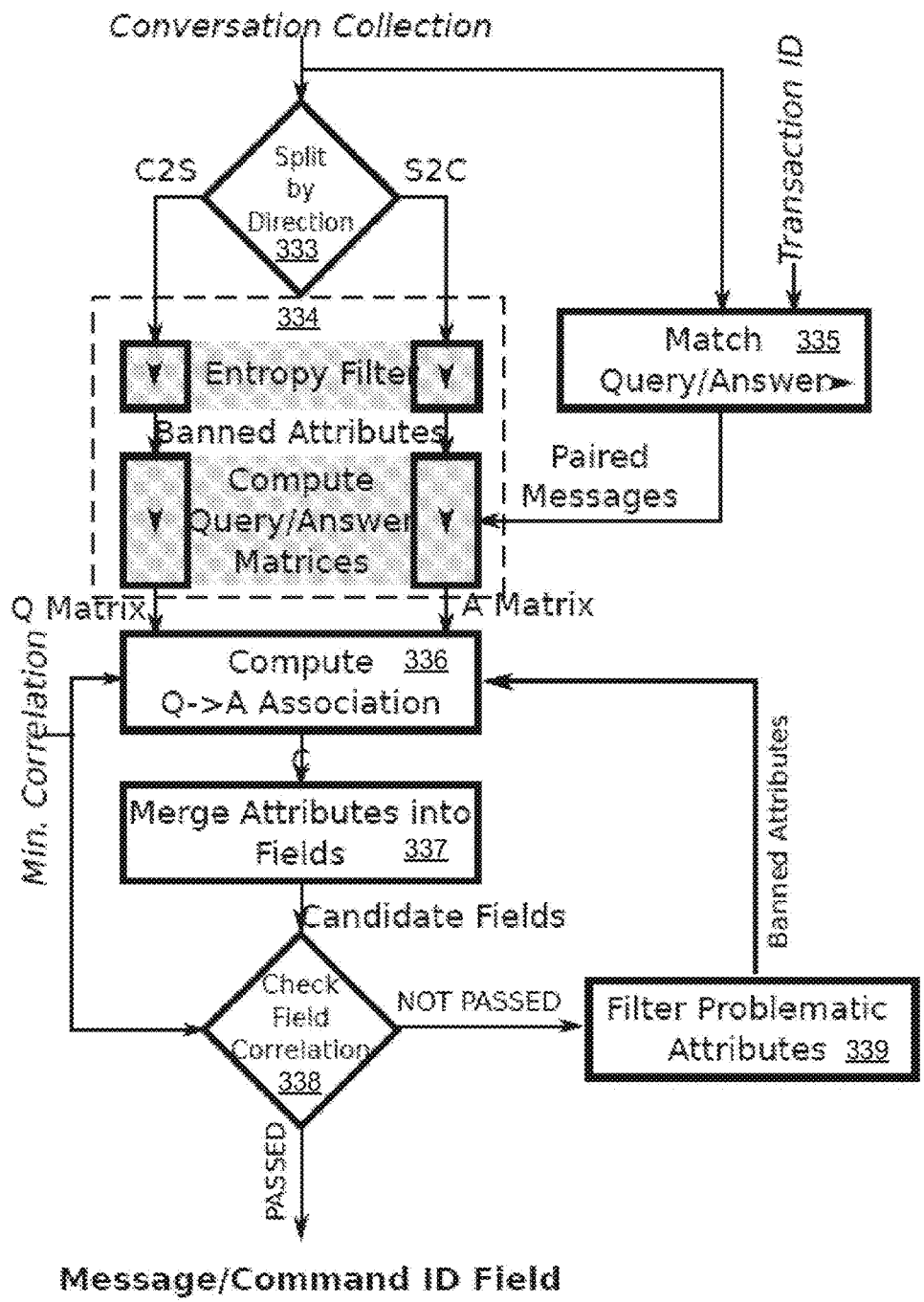
FIG. 3.3

AUTOMATIC PARSING OF BINARY-BASED APPLICATION PROTOCOLS USING NETWORK TRAFFIC

CROSS-REFERENCE TO RELATED APPLICATIONS

This application is a continuation of and claims benefit of priority under 35 U.S.C. § 120 to U.S. application Ser. No. 13/917,535, entitled "Automatic Parsing of Binary-Based Application Protocols Using Network Traffic," filed on Jun. 13, 2013, which is incorporated herein by reference in its entirety.

BACKGROUND OF THE INVENTION

Protocols regulate the communication over a network. They specify the syntax, the semantics and timing of messages that have to be exchanged by entities involved in the communication. As such, protocol specifications are fundamental to solve critical parts of network management, traffic analysis and security operations. For example, the knowledge of a protocol allows a network analyst to run traffic classification algorithms, to check for possible malicious attempts to violate a system, or simply to implement applications that use such protocol. Nowadays the number of new applications shows explosive growth in the Internet, most of which use proprietary and undocumented protocols. Online games, chat services, social network applications, novel peer-to-peer applications, or even botnets to name a few are popping out at a constant pace. Those are mostly based on closed design and technologies. This clearly limits the knowledge of protocol specifications, and hampers all mechanisms that leverage such knowledge.

While extracting signatures from the protocol syntax could be partly automated, the automatic reverse engineering of protocol specifications is a much more ambitious task.

SUMMARY

In general, in one aspect, the present invention relates to a method for analyzing a protocol of a network. The method includes obtaining a plurality of conversations from the network, wherein each of the plurality of conversations comprises a sequence of messages exchanged between a server and a client of the network using the protocol, wherein each message of the sequence of messages comprises a plurality of fields, wherein a field of the plurality field is located, within a corresponding message, at an offset and having a length that are defined by the protocol, extracting, by a computer processor, content of a candidate field from a message of the sequence of messages in each of the plurality of conversations, wherein the candidate field is located, within the message, at a candidate offset and having a candidate length, calculating, by the processor, a randomness measure of the content of the candidate field, wherein the randomness measure represents a level of randomness of the content across all of the plurality of conversations, calculating, by the computer processor, a correlation measure of the content of the candidate field, wherein the correlation measure represents a level of correlation, across all of the plurality of conversations, between the content and an attribute of a corresponding conversation where the message containing the candidate field is located, and selecting, by the computer processor, based on the randomness measure and the correlation measure, and using a pre-determined field selection criterion, the candidate offset from a plurality of candidate offsets as the offset defined by the protocol.

In general, in one aspect, the present invention relates to a system for analyzing a protocol of a network. The system includes an acquisition module configured to obtain a plurality of conversations from the network, wherein each of the plurality of conversations comprises a sequence of messages exchanged between a server and a client of the network using the protocol, wherein each message of the sequence of messages comprises a plurality of fields, wherein a field of the plurality field is located, within a corresponding message, at an offset and having a length that are defined by the protocol, a protocol field extractor executing on a processor of a computer system and configured to extract content of a candidate field from a message of the sequence of messages in each of the plurality of conversations, wherein the candidate field is located, within the message, at a candidate offset and having a candidate length, calculate a randomness measure of the content of the candidate field, wherein the randomness measure represents a level of randomness of the content across all of the plurality of conversations, calculate a correlation measure of the content of the candidate field, wherein the correlation measure represents a level of correlation, across all of the plurality of conversations, between the content and an attribute of a corresponding conversation where the message containing the candidate field is located, and select, based on the randomness measure and the correlation measure, and using a pre-determined field selection criterion, the candidate offset from a plurality of candidate offsets as the offset defined by the protocol, and a repository configured to store the plurality of conversations, the randomness measure, and the correlation measure.

In general, in one aspect, the present invention relates to a computer readable medium storing instructions, when executed by the computer to analyze a protocol of a network, the instructions include functionality for obtaining a plurality of conversations from the network, wherein each of the plurality of conversations comprises a sequence of messages exchanged between a server and a client of the network using the protocol, wherein each message of the sequence of messages comprises a plurality of fields, wherein a field of the plurality field is located, within a corresponding message, at an offset and having a length that are defined by the protocol, extracting content of a candidate field from a message of the sequence of messages in each of the plurality of conversations, wherein the candidate field is located, within the message, at a candidate offset and having a candidate length, calculating a randomness measure of the content of the candidate field, wherein the randomness measure represents a level of randomness of the content across all of the plurality of conversations, calculating a correlation measure of the content of the candidate field, wherein the correlation measure represents a level of correlation, across all of the plurality of conversations, between the content and an attribute of a corresponding conversation where the message containing the candidate field is located, and selecting based on the randomness measure and the correlation measure, and using a pre-determined field selection criterion, the candidate offset from a plurality of candidate offsets as the offset defined by the protocol.

BRIEF DESCRIPTION OF DRAWINGS

FIG. 1.1 shows a system block diagram according to aspects of the invention.

FIGS. 1.2-1.3 show example bi-directional flows and conversation collections according to aspects of the invention.

FIGS. 3.1-3.3 show various examples according to aspects of the invention.

DETAILED DESCRIPTION

Figure 2:
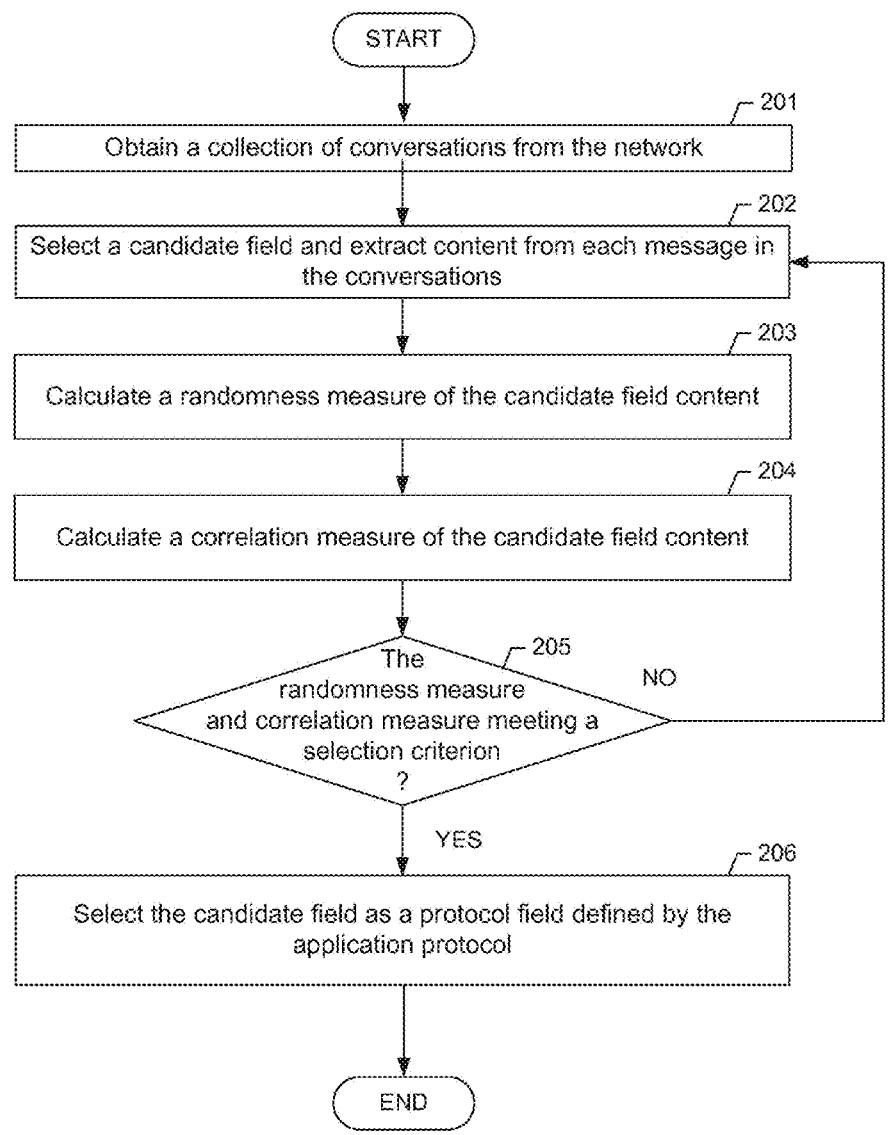
FIG. 2 shows a flowchart of a method according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts.

Generally, a flow (or traffic stream) between two network hosts is a series of data records that form messages for the communication between the two network hosts engaged in an Internet transaction. The Internet transaction may be related to completing a task, which may be legitimate or malicious. The communication between the two network hosts is referred to as a conversation. Each packet includes a block of data (i.e., actual packet content, referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise. Further, the terms "conversation" and "bi-directional flow" are used interchangeably unless explicitly stated otherwise.

A protocol, or communications protocol is a system of digital message formats and rules for exchanging those messages in or between computing systems and in telecommunications. Typically, a protocol defines the syntax, semantics, and synchronization of communication, such that each message has an exact meaning intended to provoke a particular response of the receiver. Protocols may be layered in a computer network. For example, the term "transport protocol" refers to a protocol associated with or based on top of a transport layer of the Internet. The transport protocol may be referred to as layer-four protocol, and includes TCP, UDP, etc. In another example, the term "application protocol" refers to a protocol associated with or based on top of an application layer of the Internet. The application protocol may be referred to as layer-seven protocol. HTTP (HyperText Transfer Protocol), SMTP (Simple Mail Transfer Protocol), IRC (Internet relay chat), and FTP (File Transfer Protocol) are examples of documented and published application protocols. As noted above, many Internet application protocols are proprietary and undocumented protocols. Throughout this disclosure, the terms "protocol" and "application protocol" may be used interchangeably unless specified otherwise.

Embodiments of the invention provide a method and system for analyzing a binary-based application protocol to extract and identify various fields (referred to as protocol fields) defined by the application protocol. In one or more embodiments, the binary-based application protocol being analyzed is a proprietary and/or undocumented protocol. In one or more embodiments, the proprietary and/or undocumented application protocol is based on the transport protocol of TCP and/or UDP.

FIG. 1.1 shows a system block diagram of a system (100) in accordance with one or more embodiments of the invention. Those skilled in the art, having the benefit of this detailed description, will appreciate the components shown in FIG. 1.1 may differ among embodiments of the invention, and that one or more of the components may be optional. Although specific numbers of components are shown in FIG. 1.1, different number of each component may be included. In one or more embodiments of the invention, one or more of the components shown in FIG. 1.1 may be omitted, repeated, supplemented, and/or otherwise modified from that shown in FIG. 1.1. Accordingly, the specific arrangement of components shown in FIG. 1.1 should not be construed as limiting the scope of the invention.

As shown in FIG. 1.1, the system (100) includes a protocol analysis tool (120), an analyst user system (140), and a computer network (110). The protocol analysis tool (120) includes a data repository (129), an application interface (121), an acquisition module (122), and a protocol field extractor (120a), which further includes one or more of message-length extractor (123), transaction-ID extractor (124), host-ID extractor (125), session-ID extractor (126), incrementor extractor (127), and message-type extractor (128). The analyst user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (e.g., server node (112), client node (113), data collectors (114), etc.), which are devices configured with computing and communication capabilities for executing applications in the computer network (110). In particular, the data collectors (114) are special type of nodes executing data collection applications.

As shown in FIG. 1.1, the server node (112) and client node (113) communicate with each other by exchanging data packets forming a bi-directional flow (111), which includes two uni-directional flows (111a) and (111b) represented by two arrows. In one or more embodiments, the server node (112) and the client node (113) exchange data packets in the bi-directional flow (111) as a result of an application executing on the server node (112) and the client node (113). In this context, the bi-directional flow (111) may be referred to as a conversation between the server node (112) and client node (113). Examples of the application include network applications, such as HTTP, SMPT, game applications, chat applications, etc.

In one or more embodiments, certain device(s) (e.g., data collectors (114)) within the computer network (110) may be configured to collect network data (e.g., bi-directional flow (111), among other traffic flows) for providing to the protocol analysis tool (120). Each of these components is described below. One of ordinary skill in the art will appreciate that embodiments are not limited, to the configuration shown in FIG. 1.1.

In one or more embodiments of the invention, the protocol analysis tool (120) is configured to interact with the computer network (110) using one or more of the application interface (121). The application interface (121) may be configured to receive data (e.g., bi-directional flow (111)) from the computer network (110) and/or store received data to the data repository (129). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the analyst user system (140). In one or more embodiments, the data collectors (114) are configured and/or activated by the protocol analysis tool (120).

In one or more embodiments, the analyst user system (140) is configured to interact with an analyst user using the user interface (142). The user interface (142) may be configured to receive data and/or instruction(s) from the analyst user. The user interface (142) may also be configured to deliver information (e.g., a report or an alert) to the analyst user. In addition, the user interface (142) may be configured to send data and/or instruction(s) to, and receive data and/or information from, the protocol analysis tool (120). The analyst user may include, but is not limited to, an individual, a group, an organization, or some other entity having authority and/or responsibility to access the protocol analysis tool (120). Specifically, the context of the term "analyst user" here is distinct from that of a user of the computer network (110). The analyst user system (140) may be, or may contain a form of an internet-based communication device that is capable of communicating with the application interface (121) of the protocol analysis tool (120). Alternatively, the protocol analysis tool (120) may be part of the analyst user system (140). The analyst user system (1.40) may correspond to, but is not limited to, a workstation, a desktop computer, a laptop computer, or other user computing device.

In one or more embodiments, the processor (i.e., central processing unit (CPU)) (141) of the analyst user system (140) is configured to execute instructions to operate the components of the analyst user system (140) (e.g., the user interface (142) and the display unit (143)).

In one or more embodiments, the analyst user system (140) may include a display unit (143). The display unit (143) may be a two dimensional (2D) or a three dimensional (3D) display configured to display information regarding the computer network (e.g., browsing the network traffic data) or to display intermediate and/or final results of the protocol analysis tool (120) (e.g., report, alert, etc.).

As shown, communication links are provided between the protocol analysis tool (120), the computer network (110), and the analyst user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the protocol analysis tool (120), the analyst user system (140), and the communication links may be part of the computer network (110).

In one or more embodiments, a central processing unit (CPU, not shown) of the protocol analysis tool (120) is configured to execute instructions to operate the components of the protocol analysis tool (120). In one or more embodiments, the memory (not shown) of the protocol analysis tool (120) is configured to store software instructions for analyzing the network trace to extract features (e.g., messages, slices, delimiters, keywords, commands, etc.) for analyzing the protocols used in the flows. The memory may be one of a variety of memory devices, including but not limited to random access memory (RAM), read-only memory (ROM), cache memory, and flash memory. The memory may be further configured to serve as back-up storage for information stored in the data repository (129).

The protocol analysis tool (120) may include one or more system computers, which may be implemented as a server or any conventional computing system having a hardware processor. However, those skilled in the art will appreciate that implementations of various technologies described herein may be practiced in many different computer system configurations, including multiprocessor systems, hand-held devices, networked personal computers, minicomputers, mainframe computers, and the like.

In one or more embodiments, the protocol analysis tool (120) is configured to obtain and store data in the data repository (129). In one or more embodiments, the data repository (129) is a persistent storage device (or set of devices) and is configured to receive data from the computer network (110) using the application interface (121). The data repository (129) is also configured to deliver working data to, and receive working data from, the acquisition module (122), message-length extractor (123), transaction-ID extractor (124), host-ID extractor (125), session-ID extractor (126), incrementor extractor (127), and message-ID extractor (128). As shown in FIG. 1.1, the data repository (129) stores multiple collections of conversations with associated randomness measures and correlation measures. For example, the conversion collection (131a) includes the conversion (131) that is associated with the randomness measure (132a) and the correlation measure (132b). In particular, all conversations in the conversion collection (131a) are generated based on the same application protocol. The data repository (129) may be a data store (e.g., a database, a file system, one or more data structures configured in a memory, some other medium for storing data, or any suitable combination thereof), which may include information (e.g., conversation (131), etc.) related to the network protocol analysis. The data repository (129) may be a device internal to the protocol analysis tool (120). Alternatively, the data repository (129) may be an external storage device operatively connected to the protocol analysis tool (120).

In one or more embodiments, the protocol analysis tool (120) is configured to interact with the analyst user system (140) using the application interface (121). The application interface (121) may be configured to receive data and/or instruction(s) from the analyst user system (140). The application interface (121) may also be configured to deliver information and/or instruction(s) to the analyst user system (140). In one or more embodiments, the protocol analysis tool (120) is configured to support various data formats provided by the analyst user system (140).

In one or more embodiments, the protocol analysis tool (120) includes the acquisition module (122) that is configured to obtain a network trace from the computer network (110), for example via data collectors (114). In one or more embodiments, the acquisition module (122) works in conjunction with the data collectors (114) to parse data packets and collate data packets belonging to the same flow tuple (i.e., the aforementioned 5-tuple) to form the network trace. For example, such network trace, or information extracted therefrom, may then be stored in the repository (127) as the conversion (131), etc.

In one or more embodiments, a flow parser (e.g., acquisition module (122) in conjunction with data collectors (114) in FIG. 1.1) reconstructs (e.g., eliminates redundant packets, collates packets into a correct sequence, etc.) all the packets that correspond to the same traffic flow (e.g., uni-directional flows (111a), (111b)) identified by the aforementioned 5-tuple. In one or more embodiments, the flows are captured and parsed throughout a pre-configured time interval recurring on a periodic basis (e.g., every minute, hourly, daily, etc.) or triggered in response to an event. In one or more embodiments, the captured flows are stored in the repository (127) as conversations. For example, the bi-directional flow (111) may be generated by a particular network application executing on the server node (112) and the client node (113). The bi-directional flow (111) is captured and stored as the conversation (131). Specifically, the conversation (131) includes the sequence of messages embedded in the bi-directional flow (111) that are exchanged between the server node (112) and the client node (113) using the application protocol of this particular network application. In one or more embodiments, the conversation (131) is stored in the repository (129) as part of a conversation collection (131a). Specifically, all conversations in the conversation collection (131a) are based on the same protocol to be analyzed by the protocol analysis tool (120). In one or more embodiments, all conversations in the conversation collection (131a) are generated by the same application using the same protocol. In addition, all conversations in the conversation collection (131a) may further be generated by the same application in such a manner to include same type of messages in each and every conversation. Further, multiple conversation collections may be stored in the repository (129), corresponding to multiple protocols to be analyzed by the protocol analysis tool (120). Each of these conversation collections may be created by using test-bed in which a target application is executed while traffic exchanged is being captured. Alternatively, a conversation collection may be extracted from passive observation of actual traffic by the mean of classifiers, e.g., by filtering all conversation involving a well-known port, or by relying on a Deep Packet Inspection (DPI) classifier.

FIG. 1.2 shows an example of the bi-directional flow (111) that includes a series of messages exchanged between the server node (112) and the client node (113) shown in FIG. 1.1. As shown, the vertical downward pointing arrows represent progression of time, along which data packets are exchanged between the client and the server. In particular, data packets sent from the client to the server (C-S) are labeled "CS packet" while data packets sent from the server to the client (S-C) are labeled "SC packet". Accordingly, the series of data communication exchanges between the server and the client includes CS packet (151), CS packet (152), SC packet (161), CS packet (153), CS packet (154), SC packet (162), etc. In one or more embodiments, the series of data communication are layer-seven (i.e., application layer) communications generated by the network application, which is a layer-seven application. In one or more embodiments, the unidirectional packets in-between direction changes form a unidirectional message. For example, CS packet (151) and CS packet (152) form a CS message (i.e., message A (172a)), SC packet (162) forms a SC message (i.e., message B (172b)), etc. In one or more embodiments, the message A (172a) and message B (172b) are application level messages, also referred to as application messages or layer seven messages, while the various packets included therein are layer four packets, such as UDP or TCP packets.

FIG. 1.3 shows an example of conversations (i.e., conversation collections (170)) stored in the repository (127), as shown in FIG. 1.1 above. As shown in FIG. 1.3, the conversation collections (170) includes protocol X conversation collection (171), protocol Y conversation collection (172), and protocol Z conversation collection (173). Each of these collections may be created by using test-bed in which a target application is executed while traffic exchanged is being captured. Alternatively, a collection can be extracted from passive observation of actual traffic by the mean of classifiers, e.g., by filtering all conversation involving a well-known port, or by relying on a Deep Packet Inspection (DPI) classifier.

In one or more embodiments, the protocol X conversation collection (171) is generated by a network application based on a proprietary binary-based protocol (i.e., protocol X), and includes conversation 1 (171a), conversation 2 (171b), conversation K (171k), etc. represented along the vertical direction. In particular, the protocol X conversation collection (171) and conversation 1 (171a) are essentially the same as the conversation collection (131a) and conversation (131), respectively, shown in FIG. 1.1 above. Further as shown in FIG. 1.3, the conversation 1 (171a) includes client-to-server messages and server-to-client messages along the horizontal direction representing time. For example, the client-to-server messages and server-to-client messages includes the message A (172a) and message B (172b), respectively, shown in FIG. 1.2 above.

In one or more embodiments, the application protocol X is based on the transport protocol UDP. In such embodiments, a single application message is carried into a UDP segment payload over a single IP datagram where de-fragmentation may be performed by the acquisition module (122) described in reference to FIG. 1.1 above. In one or more embodiments, the application protocol X is based on the transport protocol TCP. In such embodiments, a message ends when by a packet with the TCP PUSH flag set. Because a single application-level PDU can spread over multiple IP datagrams in TCP, TCP packet reassembly may be performed by the acquisition module (122) described in reference to FIG. 1.1 above.

Further as shown in FIG. 1.3, the conversation K (171k) includes the message C (172c) that further includes fields denoted as F1, F2, F3, etc. The offset and length of each of these fields F1, F2, F3, etc. for a proprietary protocol X are typically un-documented. To analyze the proprietary protocol X in an attempt to extract a field (e.g., F1) defined by the proprietary protocol X, the message C (172c) may be divided into candidate fields represented by the candidate fields (174). Each of these candidate fields is then separately analyzed to determine if it is the protocol field H, or a portion of F1. In the example shown in FIG. 1.3, F1 is assumed to be multiple of 8 bits (i.e., 1 byte) and byte-aligned with the message C (172c).

In one or more embodiments, the application protocol is binary-based and is referred to as a binary protocol or binary application protocol. In a binary protocol, information is encoded using groups (referred to as fields) of bits of a given length, and located in predefined offsets in the message. An example binary encoding in hex notation may be 0x003C0000D2F1, where the first two bytes 0x003C are the time-out field and the next four bytes 0x0000D2F1 represent the port number. Additional example of fields include (i) message-type field (e.g., POST or GET in HTTP) containing information describing the type of the message that follows the message-type field, (ii) session-ID field containing state information between the interactions of a pair of hosts (e.g., COOKIE field), (iii) transaction-ID field informing the client and server regarding the current request (i.e., transaction) being served, (iv) counter field, such as sequence, packet, and/or bytes counters, (v) host-ID field (client or server side) containing unique identifier(s) such as user-name, password, domain-name, and/or IP-address of a host, and (vi) meta-data, field, such as the version of protocols being used.

Returning to the discussion of FIG. 1.1, in one or more embodiments, the protocol field extractor (120a) configured to extract content of a candidate field (e.g., candidate field (132), etc.) from a message (e.g., message (132c)) of the sequence of messages in each conversation (e.g., conversation (131), etc.) in the conversation collection (131a). In one or more embodiments, the candidate field (132) is located, within the message (132), at a candidate offset and having a candidate length. Generally, multiple candidate fields may be used by the protocol field extractor (120a) to be evaluated as potential candidates of a protocol field, such as one or the message-type field, session-ID field, transaction-ID field, counter field (also referred to as incrementor host-ID field, message length field, etc. In particular, these candidate fields are defined by different candidate offsets and/or candidate lengths.

Once one of these candidate fields, for example candidate field (132), is identified and its content extracted, the protocol field extractor (120a) calculates a randomness measure (132a) and a correlation measure (132b) of the content of the candidate field (132). Specifically, the randomness measure (132a) represents a level of randomness of the content across all conversations in the conversation collection (131a), while the correlation measure (132b) represents a level of correlation, across all conversations in the conversation collection (131a), between the content and an attribute of the conversation (131) where the message (132c) containing the candidate field (132) is located. In one or more embodiments, different protocol fields correspond to different attributes used for calculating the randomness measure and correlation measure. In other words, the attribute used for calculating the randomness measure (132a) and correlation measure (132b) for a particular protocol field may be different than the attribute used for calculating the randomness measure (132a) and correlation measure (132b) for a different protocol field. Details of the attribute used for calculating the randomness measure (132a) and correlation measure (132b) for various protocol fields are described in reference to FIGS. 2-3.3 below.

Continuing with the discussion of FIG. 1.1, in one or more embodiments, the protocol field extractor (120a) is configured to select, using a pre-determined field selection criterion, the candidate field (132) from the aforementioned multiple candidate fields based on the randomness measure (132a) and the correlation measure (132b). Specifically, selecting the candidate field (132) includes selecting the candidate offset and the candidate length of the candidate field (132) as the offset and the length defined by the protocol for the protocol field.

In one or more embodiments, the protocol field extractor (120a) includes the message-length extractor (123). Correspondingly, the protocol field is the message-length field for representing a length of a corresponding message wherein the protocol field is located. In one or more embodiments, the message-length extractor (123) extracts the message-length field using the method described in reference to FIG. 2 below.

In one or more embodiments, the protocol field extractor (120a) includes the transaction-ID extractor (124). Correspondingly, the protocol field is the transaction-ID field for identifying a request/response message pair that includes a corresponding message wherein the protocol field is located. In one or more embodiments, the transaction-M extractor (124) extracts the transaction-ID field using the method described in reference to FIG. 2 below.

In one or more embodiments, the protocol field extractor (120a) includes the host-ID extractor (125). Correspondingly, the protocol field is the host-ID field for identifying a host of a corresponding message wherein the protocol field is located. In one or more embodiments, the host-ID extractor (125) extracts the host-ID field using the method described in reference to FIG. 2 below.

In one or more embodiments, the protocol field extractor (120a) includes the session-ID extractor (126). Correspondingly, the protocol field is the session-ID field for identifying a conversation where a corresponding message containing the protocol field is located. In one or more embodiments, the session-ID extractor (126) extracts the session-ID field using the method described in reference to FIG. 2 below.

In one or more embodiments, the protocol field extractor (120a) includes the incrementor extractor (127). Correspondingly, the protocol field is the incrementor field, such as a time stamp field, byte counter field, etc. In one or more embodiments, the incrementor extractor (127) extracts the incrementor field using the method described in reference to FIG. 2 below.

In one or more embodiments, the protocol field extractor (120a) includes the message-type extractor (128). Correspondingly, the protocol field is the message-type field for identifying a semantic type of the corresponding message wherein the field is located. In one or more embodiments, the message-type extractor (128) extracts the message-type field using the method described in reference to FIG. 2 below.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1.1 above.

FIG. 2 depicts a flowchart of a method to extract protocol fields from conversations generated based on an application protocol of a computer network. In one or more embodiments, the application protocol is a binary protocol. In one or more embodiments, one or more of a message-length field, a transaction-ID field, a host-ID field, a session-ID field, an incrementor field, and a message-type field is extracted. Specifically, extracting a protocol field refers to determining the offset and length of the protocol field in the message containing the protocol field. In one or more embodiments, the occurrence of the protocol field, and the offset and length thereof, are consistent throughout all messages generated using the application protocol. In one or more embodiments, the occurrence of the protocol field, and the offset and length thereof, are consistent throughout all messages, in a particular client/server direction, generated using the application protocol. In one or more embodiments, two or more protocol fields are extracted in the sequence of the message-length field, transaction-ID field, host-ID field, session-ID field, incrementor field, and message-type field. For example, the Steps 202 through 206 are performed to extract the message-length field first, before they are performed to extract the transaction-ID field while the message-length field in each message is already known. Further, the Steps 202 through 206 are performed to extract the message-type field the last, after all other fields are already known in each message.

Initially, in Step 201, a collection of conversations is obtained from the computer network. Specifically, each conversation includes a sequence of messages exchanged between a server and a client of the computer network using the application protocol. In addition, each message includes one or more fields defined by an offset and a length according to the application protocol. Specifically, each field is located, within a corresponding message, at the offset and having the length that are defined by the application protocol. In one or more embodiments, all conversations are generated by the same application using the application protocol. For example, these conversations may be created by using test-bed in which a target application is executed while traffic exchanged is being captured. Alternatively, the conversations may be extracted from passive observation of actual traffic by the mean of classifiers, e.g., by filtering all conversation involving a well-known port, or by relying on a Deep Packet Inspection (DPI) classifier. In one or more embodiments, the conversation and messages are those described in reference to FIGS. 1.2 and 1.3 above.

In Step 202, content of a candidate field is extracted from each message in each of the conversations. In particular, the candidate field is defined by its offset (referred to as candidate offset) and length (referred to as candidate length). Specifically, the candidate field located, within the message containing the candidate field, at the candidate offset and having the candidate length. In one or more embodiments, the candidate field is selected based on a pre-determined data element (e.g., a nibble, byte, word, or other consecutive data block with a pre-determined length). For example, the candidate offset corresponds to one or more pre-determined data elements from the beginning of the corresponding message. In addition, the length also corresponds to one or multiple pre-determined data elements.

In Step 203, a randomness measure of the content of the candidate field is calculated, where the randomness measure represents a level of randomness of the content across all conversations.

In Step 204, a correlation measure of the content of the candidate field is calculated, where the correlation measure represents a level of correlation, across all conversations, between the content and an attribute of a corresponding conversation where the message containing the candidate field is located. In one or more embodiments, a per-conversation correlation level is first calculated for each of the conversations. The per-conversation correlation level represents a level of correlation, across a single conversation, between the content and the attribute of the single conversation. Accordingly, the per-conversation correlation levels of all conversations are aggregated to generate the correlation measure across all conversations. In one or more embodiments, the correlation measure is specific to a particular protocol field among multiple protocol fields of the application protocol.

In Step 205, a determination is made as to whether the randomness measure and the correlation measure meet a pre-determined protocol field selection criterion. In one or more embodiments, the pre-determined protocol field selection criterion is specific to a particular protocol field among multiple protocol fields of the application protocol.

If the determination in Step 205 is negative, that is, the randomness measure and the correlation measure do not satisfy the pre-determined protocol field selection criterion, the method returns to Step 202, where a different candidate field is selected to go through the iteration of Steps 202 through 205 again. In one or more embodiments, the different candidate field is selected by changing the candidate offset and/or the candidate length of the previously selected candidate field.

If the determination in Step 205 is positive, that is, the randomness measure and the correlation measure satisfy the pre-determined protocol field selection criterion, the method proceeds to Step 206, where the candidate field is selected, from all candidate fields under analysis, as a protocol field of the application protocol. Specifically, the candidate offset and candidate length of the candidate field are selected as the offset and length, respectively, of the protocol field.

Although the iteration loop of Steps 202 through 205 are shown as a series of multiple decision iterations, the decision/determination in Step 205 may be performed in parallel for all candidate fields. For example, the pre-determined protocol field selection criterion may be based on the highest/lowest randomness measure and correlation measure. In this example, the randomness measure and correlation measure may be calculated for all candidate fields before the randomness measure and correlation measure are compared among all candidate fields.

As noted above regarding the Steps 204 and 205, the correlation measure and the pre-determined protocol field selection criterion are specific to a particular protocol field among multiple protocol fields of the application protocol. Each of the transaction-ID field, host-ID field, session-ID field, incrementor field, and message-type field is described in detail below.

In one or more embodiments, the field is the message-length field for representing a length of the corresponding message wherein the field is located. In such embodiments, the conversation attribute for calculating the correlation measure is a length indication of a message where the candidate field is located. Selecting the candidate field as the protocol field defined by the protocol is based on comparing the randomness measure and the correlation measure to a pre-determined randomness threshold and a pre-determined correlation threshold, respectively. In one or more embodiments, the candidate offset is selected as the offset defined by the protocol in response to the randomness measure exceeding the pre-determined randomness threshold and the correlation measure exceeding the pre-determined correlation threshold.

FIG. 3.1 shows an example workflow for extracting the message-length field, typically used to delimit messages from the stream of bytes delivered by TCP, or to multiplex several messages into the same UDP segment. The example workflow shown in FIG. 3.1 is based on the heuristic assumption that the content of the message-length field is linearly correlated with the actual message size. In the example shown, the Pearson correlation known to those in the art is used for illustration purpose only and should not be considered as limiting to the invention.

In block 311 of FIG. 3.1, the conversation collection (e.g., conversation collection (131a) shown in FIG. 1.1) is split by direction into the client-to-server (C2S) and server-to-client (S2C) collections that are independently analyzed because the message-length field may be defined differently depending on the message direction. The analysis of the S2C collection is illustrated in msg. length (312) while the analysis of the C2S collection follows a similar msg. length module (313). In the example workflow, the example method assumes that message-length field is a fixed-length field, such as a 32, 24, 16 or 8 bit field, and that the contents of the message-length field are random throughout the C2S collection. In the example, the entropy H(X) metric is used to quantify the randomness of a variable X. Specifically, let $p_i$ be the probability of the candidate field content taking the value i across all messages in the C2S collection; then $H(X)=\Sigma_i\ p_i$; *$\log_2 p_i$; where 0*log(0)=0. By definition, for any 1-byte long candidate field, entropy H(candidate field content) takes values between 0 (constant) and 8 (perfectly random). In the example, the entropy filter (314) removes any field candidate that has H(candidate field content) being less than a pre-determined threshold.

In block 315, the example method creates sub-collections each with messages that are selected to a particular size. In other words, different collections have different size messages. The collection is then used to compute:

(a) in block 317, a vector (i.e., vector of message length) with all message lengths as the vector's elements, and (b) in block 316, a fields values matrix containing all candidate field contents (i.e., values).

Then in block 318, Pearson correlation among the vector of message length and the fields values matrix is computed to generate the correlation measure of each candidate field.

In block 319, those candidate fields that show correlation higher than a pre-determined minimum correlation threshold are retained as selected candidate fields of the message length field.

In blocks 319 and 320, those accepted candidate fields are modeled using the following linear equations:

$$\text{len}_1 = a*V_1 + b$$

$$\text{len}_2 = a*V_2 + b$$

to extract possible integer offset b and linear coefficient a>0 that map the observed values $V_1$, $V_2$ in the candidate fields with the actual message length $\text{len}_1$, $\text{len}_2$.

If a and b cannot be found for a candidate field, then it is rejected from being a message-length field. And the example method iterates through the msg. Length module (312) to calculate the entropy (i.e., randomness measure) and Pearson correlation (i.e., correlation measure) of another candidate field.

Returning to the discussion of FIG. 2, in one or more embodiments, the field is the transaction-ID field for identifying a request/response message pair having the corresponding message in which the field is located. In such embodiments, the conversation attribute for calculating the correlation measure is the candidate field that includes a request message candidate field within a request message and a response message candidate field within a response message. Further, the attribute is a difference in contents of the request message candidate field and the response message candidate field. The correlation measure is a per-conversation constancy measure of the attribute independent of the content of the candidate field. In such embodiments, selecting the candidate field as the protocol field defined by the protocol is based on comparing the randomness measure and the correlation measure to a pre-determined randomness threshold and a pre-determined correlation threshold, respectively. In one or more embodiments, the candidate offset is selected as the offset defined by the protocol in response to the randomness measure exceeding the pre-determined randomness threshold and the correlation measure exceeding the pre-determined correlation threshold.

FIG. 3.2 shows an example workflow for extracting the transaction-ID filed.

In block 321 of FIG. 3.2, the conversation collection (e.g., conversation collection (131a) shown in FIG. 1.1) is split by direction into the client-to-server (C2S) and server-to-client (S2C) collections that are independently analyzed for comparison. Here the example method assumes transaction-ID are randomly picked by the message sender and then copied back in the responses by the message recipient. Therefore, the example method first search for candidate fields that appear random across both vertical and horizontal directions, e.g., in the protocol X conversation collection (171) shown in FIG. 1.3 above. In other words, the entropy calculated across vertical direction represents randomness across all conversations in the protocol X conversation collection (171), while the entropy calculated across horizontal direction represents randomness across all messages in a particular conversation.

Similar to the discussion regarding the message length field, the randomness of a candidate field is represented by the entropy H(candidate field). In this example, a candidate field with high entropy is a good candidate for the transaction-ID field.

In block 322, the entropy filters eliminate any candidate field that has entropy less than a pre-determined threshold, either calculated across the aforementioned vertical direction or horizontal direction.

In block 323, messages are paired in requests and responses and each candidate field is checked to see if it takes the same value in both messages. Note that the transaction-ID field may appear at different offset in request and response messages based on the protocol definition. In other words, the example method does not assume that the protocol in C2S and S2C directions use the same message formats.

In block 324, by checking among all conversations, only those pairs that pass a minimum support test are finally marked as transaction-ID fields. Minimum support allows some degree of mismatch, e.g., caused by message reordering or retransmission in the collection.

Finally, in block 325, consecutive marked transaction-ID fields are merged to form a transaction-ID field of at least minimum length. For example, if the transaction-ID field is 16 bit long and the candidate fields have been chosen as 8-bit long field, block 325 merges two consecutive 8-bit marked transaction-ID fields into a single 16-bit field.

Returning to the discussion of FIG. 2, in one or more embodiments, the field is the host-ID field for identifying a host of the corresponding message in which the field is located. In such embodiments, the conversation attribute for calculating the correlation measure is a sender IP address of the corresponding conversation. Specifically, the level of correlation is a level of per-conversation correlation representing, across all messages of the corresponding conversation, between the content of the candidate field and the sender IP address of the corresponding conversation. In this example, selecting the candidate offset as the offset defined by the protocol is based on comparing the randomness measure and the correlation measure to a pre-determined randomness threshold and a pre-determined correlation threshold, respectively. In one or more embodiments, the candidate offset is selected as the offset defined by the protocol in response to the randomness measure exceeding the pre-determined randomness threshold and the correlation measure exceeding the pre-determined correlation threshold.

Host-Id is a field used for identifying the same host over multiple communications established with several other endpoints that communicate using the same protocol. For example, in the case of some P2P applications, the "Peer-ID" field uniquely identifies a given peer when exchanging messages with other peers. The example method assumes that all messages sent by the same host carries the same Host-ID, i.e., messages sent by the same source IP address carry the same Host-ID. In other words, the example method assumes the Host-ID is strongly correlated with the IP address of the sender.

Based on this assumption, the example method measures the categorical correlation $R(X,Y)=I(X;Y)/H(X,Y)$ with a value in $[0,1]$ of a candidate field X with the sender IP address Y, where $H(X,Y)$ is the joint entropy that measures the total amount of information that X and Y jointly carry. The example workflow for extracting the host-ID field is similar to the workflow for extracting the message-length field that is described in reference to FIG. 3.1 above. Specifically, C2S and S2C conversations are separately processed and the example method check how candidate field content fit model, which in this case, the model is the random variable formed by the sender IP of the messages.

Returning to the discussion of FIG. 2, in one or more embodiments, the field is the session-ID field for identifying a conversation in which the corresponding message containing the field is located. In such embodiments, the conversation attribute for calculating the correlation measure is an identifier of the corresponding conversation in which the message containing the candidate field is located. Specifically, the correlation measure includes:

(i) a first per-conversation correlation measure representing the level of correlation, across all messages of the corresponding conversation and in a pre-determined client/server direction, between the content of the candidate field and the identifier of the corresponding conversation, and (ii) a second per-conversation correlation measure representing the level of correlation, across all of the plurality of conversations, between the content of the candidate field and the identifier of each of the plurality of conversations.

Selecting the candidate offset as the offset defined by the protocol is based on comparing the randomness measure, the first correlation measure, and the second correlation measure to a pre-determined randomness threshold, a pre-determined first correlation threshold, and a pre-determined second correlation threshold, respectively. In one or more embodiments, the candidate offset is selected as the offset defined by the protocol in response to the randomness measure exceeding the pre-determined randomness threshold, the first correlation measure exceeding the pre-determined first correlation threshold, and the second correlation measure being less than the pre-determined second correlation threshold.

Session ID is widely used in binary protocols to identify a single conversation among multiple communications between the same end-points, e.g., a video and audio session during a video-conference. Since the session-ID has to be constant during each conversation. For example, the example method looks for constant values in the aforementioned horizontal direction that appear random in vertical direction in the protocol X conversation collection (172) shown in FIG. 1.3 above.

In one or more embodiments, C2S and S2C collections are separately processed, since different Session-ID can be chosen by clients and servers. The example workflow proceeds as follows:

(i) eliminate any candidate field having constant values in vertical direction.

(ii) horizontally scan each conversation to identify those candidate field that are constant through all the conversation. Each conversation thus returns a set of candidate fields that need to be verified across different conversations.

(iii) statistically verify that the candidate fields appear correct considering a vertical collection.

(iv) Finally, merge verified candidate fields that are consecutive into fields of at least the minimum length.

Returning to the discussion of FIG. 2, in one or more embodiments, the field is the incrementor field. In such embodiments, the conversation attribute for calculating the correlation measure is a difference of contents between two candidate fields in two consecutive messages of the corresponding conversation and in a pre-determined client/server direction. Specifically, the correlation measure is a per-conversation constancy measure of the attribute independent of the content of the candidate field. Selecting the candidate offset as the offset defined by the protocol is based on comparing the randomness measure and the correlation measure to a pre-determined randomness threshold and a pre-determined correlation threshold, respectively. In one or more embodiments, the candidate offset is selected as the offset defined by the protocol in response to the randomness measure exceeding the pre-determined randomness threshold and the constancy measure exceeding the pre-determined correlation threshold.

The incrementor fields are typically used to represent message sequence/acknowledgement number, timestamps, etc. Let $\Delta$ be the difference among values (i.e., contents) of candidate fields in two subsequent messages. The example method expect $\Delta$ to be almost constant, its value depending on the incrementor measurement unit, e.g., packet, bytes, time, etc. This implies that $\Delta$ can take different values, e.g., a byte-wise counter in a protocol of variable size message length would generate different $\Delta$.

In an example workflow, incrementors are searched in C2S and S2C sub-collections separately. The example method assumes incrementors uses fields of a given length, such as 32, 24, 16 or 8 bit. For each possible candidate field, the vector of increments Δ is computed considering the consecutive messages in each conversation. Next, Δ is compressed using a logarithm function to compress large increments without compressing small ones. Then the compressed Δ is analyzed to accept deterministic variations. This is done by checking the entropy of the compressed Δ distribution, and selecting any candidate field that appears almost constant (entropy close to 0).

Returning to the discussion of FIG. 2, in one or more embodiments, the field is the message-type field for identifying a semantic type of the corresponding message wherein the field is located. In such embodiment, the conversation attribute for calculating the correlation measure is a difference of contents between two candidate fields in two consecutive messages of the corresponding conversation and in a pre-determined client/server direction. Specifically, the correlation measure comprises a per-conversation constancy measure of the attribute independent of the content of the candidate field. Selecting the candidate offset as the offset defined by the protocol is based on comparing the randomness measure and the correlation measure to a pre-determined randomness threshold and a pre-determined correlation threshold, respectively. In one or more embodiments, the candidate offset is selected as the offset defined by the protocol in response to the randomness measure exceeding the pre-determined randomness threshold and the constancy measure exceeding the pre-determined correlation threshold.

The message-type informs the message receiver which kind of message it is receiving, being it a request, a response, an error message, etc. The message-type fields typically take on few values that are observed with very different probability. For instance, "error" messages are much less frequent than "Hello" messages. In other words, message-type fields content representing "error" are much rarer than those containing content representing "Hello". Some protocols may have only few possible commands, while others may have many more. In one or more embodiments, the message-type field is extracted the last after all other protocol fields are extracted.

FIG. 3.3 shows an example workflow for extracting the message-type field. In general, the example method identifies Query/Answer message pairs, and verifies causality among them.

In block 333 of FIG. 3.3, the conversation collection (e.g., conversation collection (131a) shown in FIG. 1.1) is split by direction into the client-to-server (C2S) and server-to-client (S2C) collections that are independently analyzed for comparison. In particular, the C2S collection contains queries and the S2C collection contains answers.

In block 334, messages are vertically filtered to eliminate any candidate field having contents in those messages that are both too constant and too random. Then C2S query messages are paired with the corresponding S2C answer messages using the transaction-ID field. If no transaction-ID field is available, queries and answers are paired by their temporal sequence. Next, the "Compute Query/Answer Matrices" block builds two matrices: Q from the queries, and A from the answers. In both matrices, each column corresponds to a candidate field as a random variable, and contains the values of the candidate field as observed in the C2S or S2C collection.

In block 336, causality between each Q and A columns is computed to find those candidate fields that, given a values in Q causes a particular response in A. In one or more embodiments, the information theory metric $I(Q,A)/H(Q)$ is used to measure causality, where $I(Q,A)=H(Q,A)-H(Q|A)-H(A|Q)$ is the mutual information that measures the amount of information that Q and A shares. Those candidate fields for which the causality is higher than a pre-determined minimum causality threshold are identified as possible parts of the message-type field.

Figure 4:
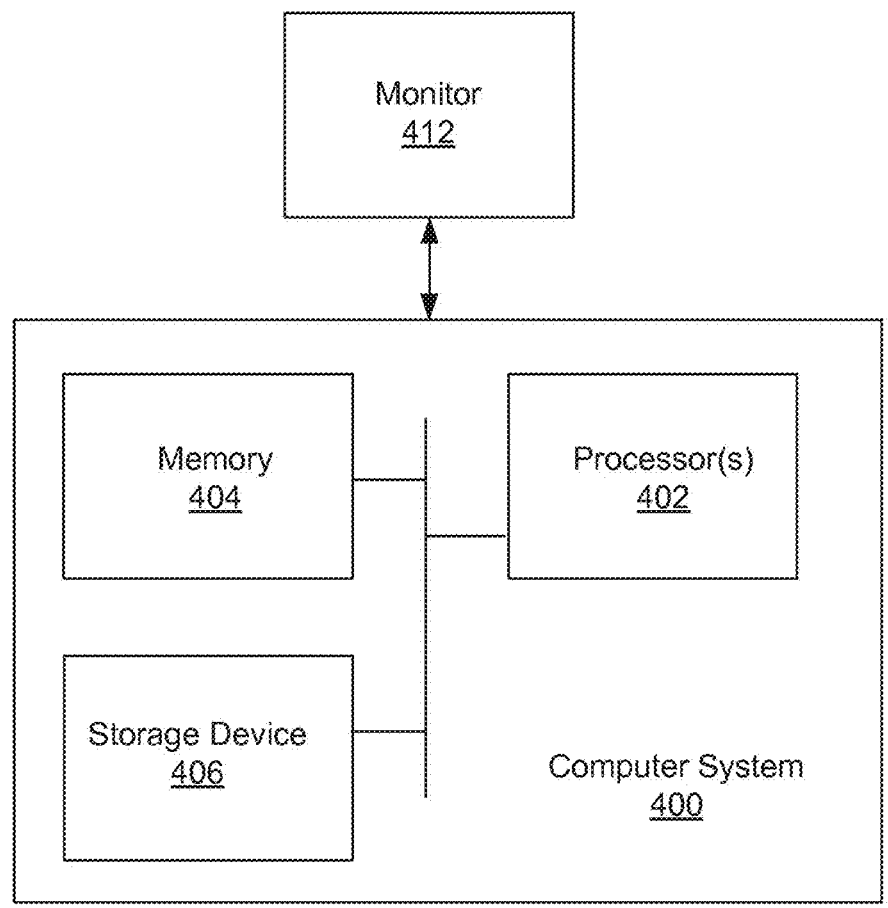
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (not shown), a mouse (not shown), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network (not shown). Further, embodiments of the invention may be implemented on a distributed system having a plurality of nodes, where each portion of the invention (e.g., various modules of FIG. 1.1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a protocol of a network, comprising:
   obtaining a plurality of conversations from the network, wherein each of the plurality of conversations comprises a sequence of messages exchanged between a server and a client of the network using the protocol, wherein each message of the sequence of messages comprises a plurality of fields, wherein a field of the plurality field is located, within a corresponding message, at an offset and having a length that are defined by the protocol;

extracting, by a computer processor, content of a candidate field from a message of the sequence of messages in each of the plurality of conversations, wherein the candidate field is located, within the message, at a candidate offset and having a candidate length; and selecting, by the computer processor, using a pre-determined field selection criterion, the candidate offset from a plurality of candidate offsets as the offset defined by the protocol, wherein the candidate field comprises a request message candidate field within a request message and a response message candidate field within a response message, wherein the attribute comprises a difference in contents of the request message candidate field and the response message candidate field, wherein the correlation measure comprises a per-conversation constancy measure of the attribute independent of the content of the candidate field, wherein selecting the candidate offset as the offset defined by the protocol comprises comparing the randomness measure and the correlation measure to a pre-determined randomness threshold and a pre-determined correlation threshold, respectively, and wherein the candidate offset is selected as the offset defined by the protocol in response to the randomness measure exceeding the pre-determined randomness threshold and the correlation measure exceeding the pre-determined correlation threshold.

2. The method of claim 1, further comprising:
determining, in response to selecting the candidate offset as the offset defined by the protocol, the candidate length associated with the candidate offset as the length defined by the protocol.

3. The method of claim 1, wherein the field is one of a message-length field, a transaction-ID field, a host-ID field, a session-ID field, an incrementor field, and a message-type field defined by the protocol.

4. The method of claim 3,
wherein the field is the transaction-ID field for identifying a request/response message pair comprising the corresponding message wherein the field is located.

5. The method of claim 1, further comprising:
calculating, by the processor, a randomness measure of the content of the candidate field, wherein the randomness measure represents a level of randomness of the content across all of the plurality of conversations.

6. The method of claim 1, further comprising:
calculating, by the computer processor, a correlation measure of the content of the candidate field, wherein the correlation measure represents a level of correlation, across all of the plurality of conversations, between the content and an attribute of a corresponding conversation where the message containing the candidate field is located.

7. A system for analyzing a protocol of a network, comprising: a processor;
memory, the memory storing one or more programs configured for:
obtaining a plurality of conversations from the network, wherein each of the plurality of conversations comprises a sequence of messages exchanged between a server and a client of the network using the protocol, wherein each message of the sequence of messages comprises a plurality of fields, wherein a field of the plurality field is located, within a corresponding message, at an offset and having a length that are defined by the protocol;

extracting, by a computer processor, content of a candidate field from a message of the sequence of messages in each of the plurality of conversations, wherein the candidate field is located, within the message, at a candidate offset and having a candidate length; and selecting, by the computer processor, using a pre-determined field selection criterion, the candidate offset from a plurality of candidate offsets as the offset defined by the protocol, wherein the candidate field comprises a request message candidate field within a request message and a response message candidate field within a response message, wherein the attribute comprises a difference in contents of the request message candidate field and the response message candidate field, wherein the correlation measure comprises a per-conversation constancy measure of the attribute independent of the content of the candidate field, wherein selecting the candidate offset as the offset defined by the protocol comprises comparing the randomness measure and the correlation measure to a pre-determined randomness threshold and a pre-determined correlation threshold, respectively, and wherein the candidate offset is selected as the offset defined by the protocol in response to the randomness measure exceeding the pre-determined randomness threshold and the correlation measure exceeding the pre-determined correlation threshold.

8. The system of claim 7, further comprising: determining, in response to selecting the candidate offset as the offset defined by the protocol, the candidate length associated with the candidate offset as the length defined by the protocol.

9. The system of claim 7, wherein the field is one of a message-length field, a transaction-ID field, a host-ID field, a session-ID field, an incrementor field, and a message-type field defined by the protocol.

10. The system of claim 9, wherein the field is the transaction-ID field for identifying a request/response message pair comprising the corresponding message wherein the field is located.

11. The system of claim 7, further comprising: calculating, by the processor, a randomness measure of the content of the candidate field, wherein the randomness measure represents a level of randomness of the content across ail of the plurality of conversations.

12. The system of claim 7, further comprising: calculating, by the computer processor, a correlation measure of the content of the candidate field, wherein the correlation measure represents a level of correlation, across all of the plurality of conversations, between the content and an attribute of a corresponding conversation where the message containing the candidate field is located.

13. A non-transitory computer readable medium embodying instructions for analyzing a protocol of a network, the instructions when executed by a processor comprising functionality for:
obtaining a plurality of conversations from the network, wherein each of the plurality of conversations comprises a sequence of messages exchanged between a server and a client of the network using the protocol, wherein each message of the sequence of messages comprises a plurality of fields, wherein a field of the plurality field is located, within a corresponding message, at an offset and having a length that are defined by the protocol;

extracting, by a computer processor, content of a candidate field from a message of the sequence of messages in each of the plurality of conversations, wherein the candidate field is located, within the message, at a candidate offset and having a candidate length, and selecting, by the computer processor, using a pre-determined field selection criterion, the candidate offset from a plurality of candidate offsets as the offset defined by the protocol, wherein the candidate field comprises a request message candidate field within a request message and a response message candidate field within a response message, wherein the attribute comprises a difference in contents of the request message candidate field and the response message candidate field, wherein the correlation measure comprises a per-conversation constancy measure of the attribute independent of the content of the candidate field, wherein selecting the candidate offset as the offset defined by the protocol comprises comparing the randomness measure and the correlation measure to a pre-determined randomness threshold and a pre-determined correlation threshold, respectively, and wherein the candidate offset is selected as the offset defined by the protocol in response to the randomness measure exceeding the pre-determined randomness threshold and the correlation measure exceeding the pre-determined correlation threshold.

14. The non-transitory computer readable medium of claim 13, further comprising: determining, in response to selecting the candidate offset as the offset defined by the protocol, the candidate length associated with the candidate offset as the length defined by the protocol.

15. The non-transitory computer readable medium of claim 13, wherein the field is one of a message-length field, a transaction-ID field, a host-ID field, a session-ID field, an incremental field, and a message-type field defined by the protocol.

16. The non-transitory computer readable medium of claim 15, wherein the field is the transaction-ID field for identifying a request/response message pair comprising the corresponding message wherein the field is located.

17. The non-transitory computer readable medium of claim 13, further comprising: calculating, by the processor, a randomness measure of the content of the candidate field, wherein the randomness measure represents a level of randomness of the content across all of the plurality of conversations; and calculating, by the computer processor, a correlation measure of the content of the candidate field, wherein the correlation measure represents a level of correlation, across all of the plurality of conversations, between the content and an attribute of a corresponding conversation where the message containing the candidate field is located.

* * * * *